United States Patent
Stückler

(10) Patent No.: US 7,907,174 B2
(45) Date of Patent: Mar. 15, 2011

(54) STABILIZATION DEVICE FOR IMAGE STABILIZATION AND ASSOCIATED METHODS

(76) Inventor: Gerd Stückler, Tegernsee (DE)

( * ) Notice: Subject to any disclaimer, the term of this patent is extended or adjusted under 35 U.S.C. 154(b) by 1197 days.

(21) Appl. No.: 11/003,871

(22) Filed: Dec. 3, 2004

(65) Prior Publication Data

US 2005/0168582 A1 Aug. 4, 2005

(30) Foreign Application Priority Data

Dec. 3, 2003 (EP) .................................... 03027791

(51) Int. Cl.
 *H04N 5/228* (2006.01)
(52) U.S. Cl. .................................................. 348/208.4
(58) Field of Classification Search ............. 348/208.99, 348/208.1, 208.2, 208.3, 208.4, 208.5, 208.6, 348/208.7, 208.8, 208.11
 See application file for complete search history.

(56) References Cited

U.S. PATENT DOCUMENTS

| | | | |
|---|---|---|---|
| 4,774,589 A | | 9/1988 | Rowland |
| 5,266,985 A | * | 11/1993 | Takagi ............................ 396/147 |
| 5,282,044 A | | 1/1994 | Misawa et al. |
| 5,587,558 A | * | 12/1996 | Matsushima ............... 178/18.01 |
| 5,587,737 A | * | 12/1996 | Sekine et al. ............... 348/208.8 |
| 5,649,237 A | * | 7/1997 | Okazaki ........................... 396/55 |
| 5,761,545 A | * | 6/1998 | Tanaka et al. .................... 396/53 |
| 5,794,078 A | * | 8/1998 | Okazaki ........................... 396/50 |
| 5,831,670 A | * | 11/1998 | Suzuki ....................... 348/208.15 |
| 5,886,744 A | | 3/1999 | Hannah |
| 6,069,656 A | | 5/2000 | Silver |
| 6,385,398 B1 | * | 5/2002 | Matsumoto ..................... 396/52 |
| 6,414,715 B1 | | 7/2002 | Sato |
| 6,445,411 B1 | | 9/2002 | Ishida et al. |
| 6,616,715 B2 | | 9/2003 | Kitoh et al. |

FOREIGN PATENT DOCUMENTS

| | | | |
|---|---|---|---|
| JP | 2126253 | A | 5/1990 |
| JP | 3083459 | A | 4/1991 |
| JP | 5216104 | A | 8/1993 |
| JP | 5249529 | A | 9/1993 |
| JP | 7110501 | A | 4/1995 |
| JP | 7114054 | A | 5/1995 |
| JP | 09326955 | | 12/1997 |
| JP | 1016168 | A | 6/1998 |
| JP | 10161168 | | 6/1998 |
| JP | 10161171 | | 6/1998 |
| JP | 10161177 | A | 6/1998 |
| JP | 10307309 | A | 11/1998 |

\* cited by examiner

*Primary Examiner* — Nicholas G Giles
(74) *Attorney, Agent, or Firm* — Lathrop & Gage LLP

(57) ABSTRACT

A stabilization device for a hand-held image capture system has (a) a controller for determining the alignment difference between an actual alignment of the image capture system and a target alignment of the image capture system, and (b) a compensation device for compensating the effect of the determined alignment difference on a projected image section. A communication device, in particular an optical display, is provided for communicating the alignment difference concerning pre-definable alignment difference values or ranges of values, such that a user is able, by adjusting the orientation of the image capture system, to steer the alignment difference to a pre-determined or arbitrary value or into a pre-determined range of values. Functions for influencing the target image alignment or for other control purposes may be assigned to a pre-determined range of values.

15 Claims, 7 Drawing Sheets

STABILIZATION DEVICE FOR IMAGE STABILIZATION AND ASSOCIATED METHODS

RELATED APPLICATIONS

This application claims priority to European Patent Application No. 03 027 791.7, filed on Dec. 3, 2003 and incorporated herein by reference.

BACKGROUND

In certain image capture systems it is often desirable to suppress (a) blurriness of individual pictures, (b) undesired displacements of individual image sequence frames or (c) unevenness of an image motion path during panning. This applies particularly to hand-held image capture systems that capture a sequence of images, for example film cameras and binoculars.

The prior art has various solutions that are known. For film shots, tripods are often used, since to date only these satisfy professional requirements for blur-free images. The disadvantage of tripods lies in their size and weight. Therefore stabilization systems have been incorporated into image capture systems, particularly binoculars and video cameras.

There are therefore stabilization systems integrated within image capture systems, or placed thereon, wherein controllable optical elements shift the image projected to the focal plane. Mirrors, variable prisms or lenses, which can move laterally to the optical axis, are for example employed as controllable optical elements. Their displacement is controlled by a movement sensor such that image shifts caused by trembling of the image capture system is compensated. Such systems have the advantage that they can also be used for film cameras, which record on chemical film.

In addition, for image capture systems with electronic capture sensors, such as video cameras for example, there are image stabilization systems which select the image section to be utilized. This image section (and/or capture sensor) is shifted by a movement sensor such that image shifts caused by trembling of the image capture system are followed as exactly as possible in the sensor plane.

These optical and electronic stabilization systems essentially work on the same control principle. A desired target alignment or target alignment sequence of the image capture system and thus a desired image section or image section sequence is compared with the real particular actual alignment of the image capture system, and an alignment difference is determined thereby. Solutions of the most varied kind, which for example use acceleration sensors, gyroscopic systems, angular measuring devices, etc., are already known for technically executing such determination of the alignment difference. Any deviation from the desired image detail caused by a particular alignment difference is compensated by one of the compensation devices described above.

Both optical and electronic stabilization systems operate to suppress undesired high frequency alignment differences according to this control arrangement. However they do not account for low-frequency alignment differences which are caused particularly by a user through his unavoidable, slow swaying movements, whenever for example he is holding a film camera or binoculars by hand. These slow movements cannot be compensated, at least above a certain limit, since otherwise it would not be possible to carry out image section displacements during an intended panning movement of the image capture system. Conventional stabilization systems do not have the facility of clearly differentiating whether a slow movement of the image capture system beyond a certain limit is undesired or intended.

None of the systems known to date can meet all requirements of an ideal stabilization system. A tripod only results in perfectly blur-free image detail with a stable base, whereas perfect, even panning can only be achieved with great difficulty, since the panning speed in practice depends on the amount of pressure on the panning lever and whereas the operator gets no feedback as to whether he possibly is exceeding the allowable maximum panning speed. The known optical and electronic stabilization systems suppress undesired high-frequency trembling, but they cannot achieve a completely motionless and blur-free image sequence or stabilization of a motion path, which for example is necessary in the case of horizontal panning.

SUMMARY

A stabilization device for an image capture system, for example a film camera, binoculars, a photo camera, enables the user to stabilize an image and/or stabilize the motion path of the image, and optionally stabilize the sequence of a pre-programmed motion path. Such a stabilization device may provide (a) a motionless, blur-free image sequence of arbitrary duration without undesired jitter and swaying movements and/or (b) even image shift movements, for example when panning using a hand-held image capture system, whereby the user has control of whether, when and how an image section ought to be shifted.

In one embodiment, such a stabilization device includes (a) a controller that determines an alignment difference between an actual alignment of the image capture system and a target alignment of the image capture system, and a compensation device that compensates for the alignment difference on a projected image section. A communication device, such as a display, communicates the alignment difference with respect to pre-definable alignment difference values or ranges of values, such that a user is able, by adjusting the orientation of the image capture system, to steer the alignment difference to a pre-determined value or into a pre-determined range of values.

Through the communication device, therefore, the alignment difference between the actual alignment and target alignment can be held for example in the proximity of the alignment difference value zero by the user orientating the image capture system. Thus, due to the stabilized image, an undesired and unnoticed slow deviation of the alignment difference further and further from zero can be avoided.

In conventional stabilization devices, the user cannot recognize this positional difference and make corresponding corrections in the alignment of the image capture system; the consequence of this was that when a certain positional difference was exceeded, image shift was inevitable, since the stabilization device had to interpret such an alignment difference as desired displacement of the image section. In addition, the amplitude of inadvertent slow fluctuations of the alignment difference may be lessened, according to the invention, due to feedback through the communication device to the user, as compared to prior art systems without this feedback. Accordingly, the efficiency of conventional stabilization devices as such can be improved. Furthermore, stabilization devices with a reduced stabilization range compared to conventional solutions can also be used.

The deviation of the alignment difference in relation to a pre-determined value or range of values can be communicated in various ways, also acoustically for example. Preferably, however, the communication device is an optical display.

The deviation of the alignment difference from zero or from the limits of an alignment difference range may be communicated for example through arrows arranged on the side of the viewfinder. The amount of deviation may for example be indicated by the brightness, color and/or flash frequency of the arrows. Such a display has the advantage that it does not conceal the viewfinder image, as is desirable with binoculars for example.

In one embodiment, the display, in particular in the case of film cameras, may be implemented in a graphic way by means of an electronic display, which is overlaid onto the viewfinder image. The graphic display has the advantage that the user can simply control an alignment difference more precisely and that several types of alignment differences can be clearly displayed with their pre-definable alignment difference values or ranges of values, as is desirable for professional applications, for example. In particular, at least one function is assigned to at least one range of difference values for influencing the target image position or for other control purposes.

In accordance with one embodiment of the stabilization device, parameters defining the target image section, such as target alignment of the optical axis and its target movement, can be specified via algorithms, which for the most important stabilization functions—for instance image freeze, even movement, acceleration and deceleration while panning—are independent of the alignment difference, provided the alignment differences lie within a pre-definable alignment difference range assigned to the respective function.

When using the term "pre-definable" as well as the terms "preset" and "predetermined" in the context of this specification, the scope of these terms may include "fixedly set", "variably settable", "automatically settable", and "user induced," wherein an alignment difference range is fixed during operation, as chosen by the user or automatically, or wherein the alignment difference range is subject to variation or modification during use, again either automatically or user-induced.

There may also be functions and alignment difference ranges assigned thereto, for which the alignment difference values are included in the pre-determined target alignment, such as for example the function of shifting the image section analogously with alignment of the image capture system.

It is advantageous to pre-set the alignment difference range assigned to a function greater than the extent of the alignment difference fluctuation amplitude or disturbance values caused by the user due to his trembling and swaying. Thus a alignment difference range assigned to the "image freeze" function, for example, can be +/−2 degrees in each direction relative to the target alignment of the optical axis of the image capture system, which is somewhat greater than a typical alignment difference fluctuation amplitude of the optical axis caused by the user.

Accordingly, the user can now intentionally produce an image section freeze by steering the alignment difference through corresponding alignment of the image capture system into this range assigned to the "image freeze" function and holding it there, which he can do for any arbitrary duration due to feedback via the communication device and the amount of the alignment difference range for image freeze. The target alignment data, for example the target alignment data of the optical axis, are kept constant even if the alignment differences vary for example within +/−1 degree due to trembling or swaying of the user. Since the effect of any alignment difference on the projected image section is constantly fully compensated by the compensation device, independent of frequency, the effects of undesired fluctuation of the structural optical axis on an image freeze may be eliminated.

In operation, if the image section has to be shifted, the user steers the alignment difference value out of the range reserved for "image freeze" and into a alignment difference range, for example provided for analogous displacement of the image section, as described below.

In one embodiment of the stabilization device, for example when used with professional film cameras, several types of alignment differences may be considered at the same time, such that an image section is unaffected by inadvertent movements in any direction. The additional technical complexity and cost of the stabilization device within such image capture systems is relatively minor.

Accordingly, both the directional alignment difference of the structural optical axis to a target alignment and the positional difference of a point of reference of the image capture system to a target position is determinable, and preferably so is the horizon difference of the image capture system to a target horizon position. The advantage of stabilizing the image horizon is particularly relevant in the case of film shots. By taking into consideration the positional difference, shots with extreme tele-focal lengths can also be stabilized: for example, if the captured image section is only 20 cm wide and the image capture apparatus sways by 1 cm to the side, then the image section inadvertently shifts by as much as 5% of the image width. The point of reference difference may be determined only in the plane perpendicular to the alignment of the optical axis, since undesired displacements of the image capture system along the optical axis only result with close-ups of the captured image section.

The compensation device therefore compensates, independent of frequency, the effects of various alignment differences determined on the captured image section. For compensating the positional difference, an approximation solution may be used (whereby an angle, which is added to the value of the directional alignment difference determined so that the compensation device only has to compensate two types of alignment differences) is computed from the value of the point of reference difference and the momentary distance adjustment of the lens. The angle results from W=arctan [point of reference difference/distance]. In order to compensate the horizon difference, if present, the whole electronic image sensor may be rotated, or electronics for rotating the evaluated image section on the image sensor may be used.

For each of the three types of alignment differences, the alignment difference total value, which is compensatable by the compensation device, is preferably divided into several alignment difference ranges, to which various range functions are assigned to carry out a particular stabilization function or for other control purposes. These range functions are executed provided the corresponding alignment difference is located within the corresponding alignment difference range, which may be dependent on minimum holding times. This may provide an advantage in that range functions are not inadvertently executed and/or terminated, if for example unintentionally, due to a trembling or swaying movement, an alignment difference range is only relinquished for a short time.

According to one embodiment, for purposes of communicating and evaluating the alignment difference in regard to alignment difference ranges, a variable offset value can be added to the physical alignment differences which is calculated so that the average physical alignment difference always falls back to zero or close to zero in a predetermined time, e.g., 1 sec., and/or so that the high frequency fluctuations of the physical alignment difference values are suppressed. The predetermined time can be set for example to 0.5 s, 1 s or 2 or more seconds. By utilizing this measure, relatively non-complex compensation devices may be used that can provide good quality images for relatively small alignment differences. In case of larger alignment differences, images achievable with such relatively non-complex alignment devices may be subject to image deficiencies such as chromatic aberration and distortion, which could become especially noticeable in case of still images or uniformly moving image sequences.

In one embodiment, high-frequency fluctuations of the alignment differences are suppressed, with exception of the values fed to the compensation device, wherein fast jitter of an indicated alignment difference is less visible and/or smoothed in the display; the alignment difference is then more easily controlled by the user, holding by hand an image capture system equipped with the invention.

For image capture systems such as professional film cameras, for example, the following alignment difference ranges corresponding to the most important stabilization functions may be provided, with "discrete" range functions assigned thereto to pre-define the target image section alignment, wherein the respective alignment difference value is not included (only the fact that the current alignment difference value is located in a certain alignment difference range is considered) so that inadvertent fluctuations of the image capture system continue to have no effect on the projected image section:
  freeze of the image section center
  retention of the momentary movement of the image section center
  retention of a desired image horizon
  restriction of the movement to pre-set values and maximum values regarding velocity and/or acceleration Accordingly, three important functions of a stabilization device for a film camera may be achieved, namely a shot of a static or evenly-moving image section—free from inadvertent movements of the film camera—or a shot during horizontal panning with steady start, even progression and steady finish.

Alignment difference ranges may also be provided for image section displacement analogous to the alignment of the image capture system and "analogue" range functions assigned thereto for pre-determining the target image section alignment, wherein the respective alignment difference is also included so that movements and/or fluctuations of the image capture system also affect the projected image section:
  change in the momentary movement of the image section center
  change in the momentary image horizon
  change in the positional point of reference of the image capture apparatus, Since changes in a movement mostly occur during a very brief period, unsteadiness due to fluctuation is only slightly noticeable, so that the advantage of controlling a change in velocity and direction by means of analogously controlled alignment of the image capture system prevails.

For communicating the three types of alignment difference concerning the alignment difference ranges, an optical display may be used. In particular, these three types of alignment differences and their components, as well as the alignment difference ranges assigned to the different functions, may be displayed in graphic form. For film cameras with an optical viewfinder, for example, the display may be overlaid over this viewfinder image. In the case of video cameras, the existing viewfinder image display may be used.

DETAILED DESCRIPTION OF THE FIGURES

In various embodiments hereof, features mentioned above and those described below may be used alone or in combination without departing from the scope of the present invention.

Figure 2:
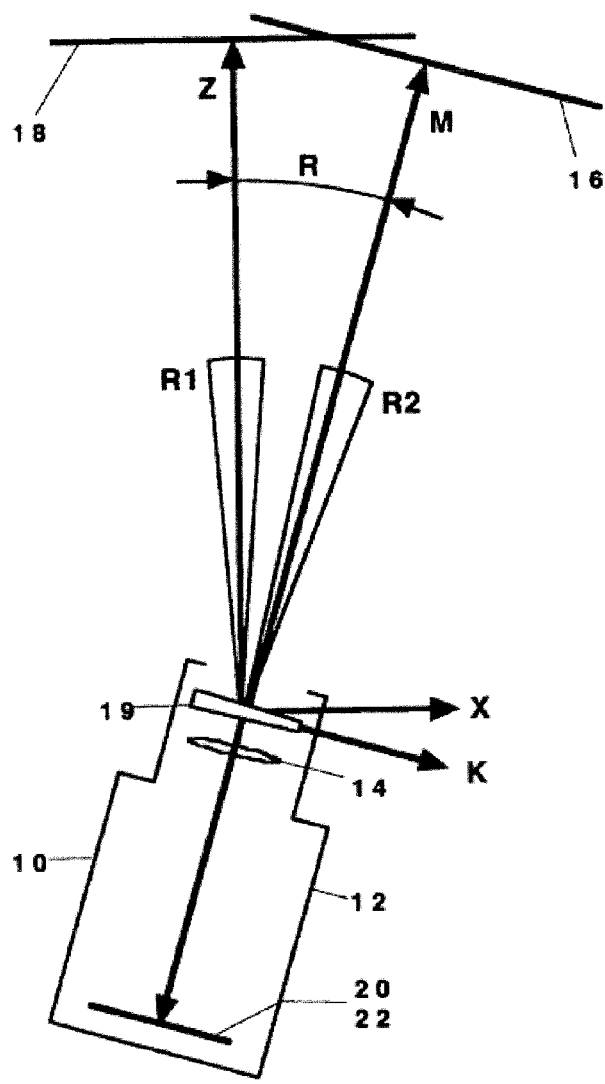
FIG. 2 shows a diagrammatic view of an image capture system, such as a film camera or binoculars, wherein the stabilization device according to the invention can be used.

Accordingly to one embodiment, a stabilization device according to the invention can be used, for example, within an image capture system schematically shown in FIG. 2 as a camera 10. Camera 10 has a housing 12 in which the stabilization device according to the invention is arranged together with further components. The lens of the film camera 10 is shown schematically simplified and is designated with the numeral 14. Lens 14 defines a structural optical axis of the film camera 10, which is designated with the letter M. Structural optical axis M in its turn defines an image section designated as structural image section 16. Illustratively, the optical axis M is directed toward the center of this structural image section 16. A "structural image section" is understood to mean the image section which is captured by camera 10 and/or is present in the viewfinder of the camera, when no compensation and/or stabilization of the image is implemented by means of compensation devices as described herein. The structural image section is therefore also to be understood as the image section the center of which is defined by the structural optical axis M. Thus it is to be understood that the term "structural image section" to a certain extent designates a "virtual" image section, which actually is not usually to be captured and/or observed by camera 10.

A target image section designated with the numeral 18 is the image section that is desired by the user; that is, the user would like to maintain this target image section 18 and/or its displacement movement for a certain period and/or arbitrary duration, for example. The corresponding target alignment of camera 10, also called the effective optical axis, is designated with the letter Z. At the point of time illustrated in FIG. 2, camera 10 is directed along its structural optical axis M, which differs from the target alignment Z by a difference angle R. The size of this angle results from the alignment difference caused by the user through intentional alignment of the camera plus a disturbance angle caused by the unavoidable trembling and swaying of the user.

This alignment difference R can be compensated by means of a first compensation device 19 located in front of the lens 14. Accordingly, the effective optical axis of camera 10 at the time point illustrated in FIG. 2 is Z, although the structural optical axis is M.

A further axis X runs in the image shift device 19, perpendicularly to the axis Z and through the intersection of axes M, Z, a plane extending through the axes X and Z describing the target horizon of the target image section 18.

The structural horizon of camera 10 is defined by the axis M and an axis K running perpendicularly thereto, whereby the structural horizon plane of camera 10 extends through these two axes.

The connection between target horizon and structural horizon may be illustrated on the basis of the following example: if it is assumed that the axes M, Z and X run in the projection plane of FIG. 2, that is to say horizontal, and only the axis K has a component perpendicular to this projection plane, then the target horizon also runs in the projection plane, thus horizontally, but the structural horizon runs diagonally to this, as shall be clarified later with reference to FIG. 1 discussed below.

Camera 10 may have a further compensation device designated with the numeral 20, to compensate the alignment difference between structural horizon and target horizon, as designated with the letter H below. Compensation device 20 here is provided in the focal plane 22 of the camera 10 and compensates the horizon difference, for example by corresponding rotation of the electronic image sensor.

The alignment direction difference R illustrated in FIG. 2 is only caused by an angular movement of the film camera 10 around the intersection of the axes M, Z. Linear deviations of the point of reference may also be taken into consideration, i.e., deviations substantially perpendicular to the axis Z defining the target image section. Such deviations are designated below with the letter C2.

Figure 1:
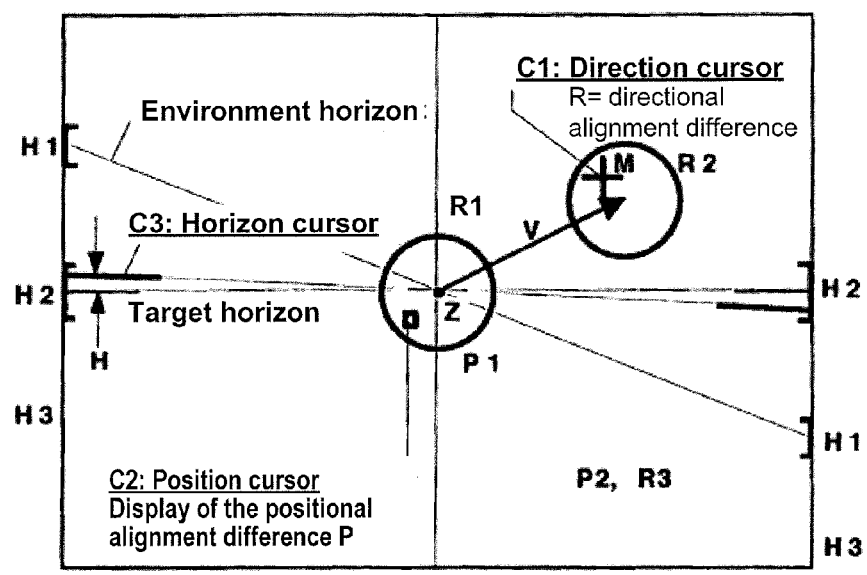
FIG. 1 shows an embodiment of a viewfinder image, such as for a film camera, that may be implemented in the context of the invention.

FIG. 1 illustrates a viewfinder image, which can be used in the context of the stabilization device according to the invention. Firstly, axes Z and M can be recognized in the viewfinder image shown in FIG. 1. The axis Z here is located in the center of the viewfinder image. By means of geometrical figures which can be displayed in the viewfinder image, various alignment trembling difference ranges may be defined, which can be assigned to different functions in each case.

To indicate the directional alignment difference, i.e., the deviation between the axes Z and M, a direction cursor C1 may be displayed; C1 may be displayed in the form of a flashing small cross, as shown. Cursor C1 is preferably indicated in the center of the viewfinder display if the momentary directional alignment difference is equal to zero.

A directional difference range R1 for the discrete range function "freezing of the image section center" is projected in the center of the display, preferably in the form of a circle. This range corresponds for example to a directional difference range of one degree around the target direction of the image section center. The range function is executed whenever the direction cursor C1 is steered into the circle R1 and held there; it then keeps the target directional alignment constant, which corresponds to freezing of the image section center.

If the cursor C1 is steered out of the range R1, it thus moves into the remaining range R3, to which the analogue range function "change of the momentary movement of the image section center" is assigned; this function may operate as follows. The target direction is determined by the direction in which the cursor C1 leaves the circle R1. As soon as the cursor is outside R1 for a minimum time, a vector is determined, indicated as arrow V, which starts from the center of the circle. From this moment, the directional difference range R1 is deactivated, although it may continue to be displayed. The length and direction of the arrow V are a measure of the size and direction of the momentary target displacement velocity of the target image section, this preferably by taking account of the momentary image angle of the lens and being measured in image section widths per second. The arrow length may be approximately proportional to the logarithm of the momentary target velocity, the initial velocity being very low or equal to zero and the initial length being, for example, equal to the radius of R1.

By steering the cursor position of the cursor C1 (through corresponding directional alignment of camera 10), the head of the arrow is now steered in any arbitrary direction and, in this way, direction and velocity of the movement of the target image section are changed. Preferably, the head of the arrow does not follow the cursor C1 directly, but with a certain time lag. The greater the distance of the cursor C1 from the head of the arrow, the faster it is tracked, so that it never departs very far from the cursor C1. Preferably, a feedback is given to the user/operator, such as by flashing of the arrow, when the target displacement velocity reaches a predefineable value. This may be important when filming with 24 frames per second, for example, where a quick pan may give a stuttering effect. If the range R2 described below is activated around the head of the arrow, only the distance between cursor and range limit of R2 may be considered. In this manner, the target image section can be shifted similar to the camera alignment in any arbitrary direction and with arbitrary velocity, whereby this displacement is possible with sensitivity because of the acceleration algorithms applied. Swaying the camera however during the execution is not suppressed entirely during this analogue range function, since it affects the modification of the velocity vector.

When the velocity has again been reduced to the initial value, wherein the arrow length is again to the initial length, the arrow disappears and the directional difference range R1 becomes active again.

A directional difference range R2 may also be provided and displayed at the tip of the velocity vector V, preferably in the form of a circle R2, the radius of which may be variable and equal to the arrow length minus the radius of R1 (although its size should not be greater than a pre-determined maximum value).

The discrete range function assigned to the range R2 may be executed whenever the cursor C1 is steered into this circle R2, to keep the momentary target velocity and target direction of the image section displacement constant, provided the cursor is held in this circle R2.

In one embodiment, the display of the range R2 is omitted. Instead, the cursor C1 changes its color and/or flash frequency, for example, when approaching the (now invisible) edge of the circle and/or after passing it.

One advantage of this range R2, which is variable in its position, lies in the fact that acceleration of an image section movement can be terminated in an intuitive way and changed to an even motion by the user steering the cursor C1 into the range R2 always located in the proximity of the cursor.

A position cursor C2 reflects the deviation of the point of reference of the image capture system from a target position of the environment. The effect of this distance with its unavoidable fluctuations should be taken into consideration particularly with extreme telephoto shots and compensated by the compensation device.

Accordingly, a discrete range function for stabilizing the camera position fluctuations and a positional difference range assigned thereto may be provided, which is indicated for example in the form of a circle P1 in the center of the viewfinder image (FIG. 1); the area of circle P1 corresponds to a positional difference value range of, for example, 8 cm in diameter. In the example, P1 coincides, for the sake of clarity, with the circle R1. The range function communicates over size and direction of this difference, together with the focal distance described above, to the compensation device. It is executed whenever for example a position cursor C2 (represented by a small square, for example as shown in FIG. 1) is steered by moving the image capture system to the side and height-wise into the range P1 and held there. In the case of film cameras, a substantially smaller range of values is preferably assigned to P1 during pauses in shooting, which has the advantage that C2 always lies at the start of filming in the proximity of the centre of P1.

If the cursor C2 is located outside the positional difference range P1 in the remaining range P2, the deviation from the point of reference of the environment may be taken back again according to an algorithm to the range limit P1. This corresponds to a correlational movement of the positional point of reference of the environment with the camera, serving to characterize the target position.

Ranges, functions and displays regarding the horizon difference are now discussed in various examples.

A horizon cursor C3 reflects the deviation of the camera horizon from the target horizon. It is for example indicated by two short lines on the viewfinder display edge, which lie on an imaginary line running through the display center, the position of which is similar to the angle between the camera horizon and the target horizon, whereby the target horizon preferably always runs horizontally through the viewfinder image center.

A discrete range function may be provided for a target horizon position parallel to the real horizon. It is for example executed whenever the horizon cursor C3 is steered by aligning the camera around its optical axis into the corresponding horizon difference range H1 on the viewfinder edge, and held there. This range for example comprises an angle of +/−3 degrees to the target horizon. The range function then sets the target image horizon to zero. Hereupon, the compensation device in this embodiment automatically keeps the projected horizon parallel to the real horizon, whereby its position is then no longer affected by trembling and swaying of the camera.

An analogue range function for changing the target horizon position may be provided. The rotation and rotation velocity of the target horizon may for example approximately follow the rotation of the camera around its optical axis. This analogue range function is for example executed whenever the horizon cursor C3 is steered through rotating the image capture system around its optical axis out of the horizon difference range appertaining to the momentary horizon position. Then the change in the target horizon angle is all the faster the further the cursor C3 is distant from the range H1 and/or H2. During execution of this analogue range function, swaying of the camera is also included in the movement of the image horizon.

A discrete range function for keeping the momentary target horizon position constant may be provided. This is for example executed whenever the cursor C3 is steered by aligning the camera around its optical axis into the corresponding positional difference range H2 on the viewfinder edge and held there. This range H2 preferably is only indicated if the target horizon deviates from the horizon of the environment. The horizon difference range H2 preferably lies on the left and/or right of the viewfinder center and comprises for example an angle of +/−2 degrees. The discrete range function then keeps the momentary target horizon angle constant. Hereupon, the projected image horizon is then automatically held by the compensation device parallel to the target horizon, its position not being affected by trembling and swaying of the image capture apparatus.

Directional difference ranges and their discrete range functions for horizontal or vertical panning are preferably provided for film cameras. These, as described below, may be activated by selection from a menu, whereby the desired maximum panning speed can be pre-selected at the same time. Subsequently, panning preferably begins in the direction in which the cursor C1 leaves the central range for image freeze, whereby the direction of motion of the target image section is limited to horizontal and/or vertical movement. The start is preferably made with constant acceleration, until the pre-selected panning speed is reached. The finish also occurs with the same braking acceleration, when the cursor is again steered into the central range. After stopping, the normal difference ranges are again activated.

Due to discrete range functions, all phases of panning, including start and finish, may thus remain free of undesired fluctuations. In connection with the compensation of horizon fluctuations, panning shots may be captured more steadily than with a tripod and can be taken by hand.

Certain special functions are now described. First, a function for system control during a shot is illustrated by example. A directional difference range can be activated and displayed by pressing a key; this function may extend over the whole display and operate to keep the momentary movement of the image section constant. Such a key can be provided for example in a suitable place on the housing of the image capture system (e.g., with housing 12 on camera 10, FIG. 2). This range is for example overlaid with further alignment difference ranges labeled or provided with symbols, to control system parameters of the image capture system such as, for example, white balance, color temperature, grey filter, aperture, exposure time, activation of panning ranges with selection of maximum panning speed, etc. They may be selected by steering the cursor C1 into their corresponding range and executed for example when releasing the key.

An advantage of this range function may exist in that, by corresponding alignment of the image capture system, any control function can be intentionally executed, even during a continuous shot and without removing the eye from the viewfinder and without disturbing the image section and its even movement.

Second, a function for adjusting focus during a shot is illustrated by example. Again, perhaps by pressing a key on camera 10, for example, a directional difference range may be activated. In one embodiment, the limits of this range are optically laid over the viewfinder image covering a substantial part hereof; it keeps the momentary movement of the image section constant and continually determines the corresponding point in the image section from the cursor position. It then communicates this information continuously, or on activation of a key, to an automatic focus device, to focus this point of the image section. The remaining alignment difference range is preferably assigned to an analogue range function to change the momentary movement of the image section.

An advantage of this range function may exist in that, even during a continuous shot by corresponding alignment of the image capture system, focusing may be automatically carried out intentionally on any point of the image so that both intentional focus shifts as well as continuous focusing on an object moving in the image section are possible while keeping the motion path of the image stabilized.

Functions for pre-programming and program-controlled execution of an image section sequence for film cameras is now discussed. An example sequence is implemented for example as follows:

The cameraman aligns the camera to the start image.

The cameraman presses a start image key and begins with the image shift.

The system control stores the respective momentary position of the image section, the respective image angle of the lens and the respective distance adjustment in a memory at regular periodic intervals.

The cameraman presses a finish key, when the desired final image is reached and the length of time it has been displayed is sufficient.

The system control smoothes out irregularities of the stored motion sequence according to mathematical algorithms.

The image position control slowly leads the image section back to the start image and instructs the cameraman by flashing of the central circle R1 in the display, for example, to hold the direction cursor C1 within or at least in the proximity of the flashing circle while the camera returns to the initial position. When the initial position is reached, the central circle stops flashing.

The cameraman begins to film, as a result of which the image position control starts the stored target motion sequence and by flashing of the central circle R1 instructs the cameraman to hold the direction cursor C1 within or at least in the proximity of the flashing circle. Hereupon the cameraman is instructed as to how to align the camera, so that the compensation device does not exceed its technically restricted range limits. The desired image section sequence is now recorded exactly; the image angle of the lens and the distance may also be continuously modified.

In the case of an image capture system in the form of stabilized binoculars, a variant of the invention is now described below which permits a static image section, substantially free from the influence of inadvertent movement of the binoculars, with simultaneous control by the user as to when and for how long an image is to be frozen and/or when the image section ought to be shifted. Through an integral gyroscope or other motion sensor, the movement of the structural optical axis is registered and the directional difference (for example to a target directional alignment stored in a memory) is continuously determined. The effect of this directional difference on the projected image section is compensated by an optical compensation device for the directional difference. This means that the projected image section is frozen provided the target alignment does not change and the directional difference does not exceed the values which can be compensated by the compensation device.

In one embodiment, the first directional difference range is pre-determined by the stabilization device according to the invention in the form of a cone, for example with an angle of 2 degrees around the target alignment of the optical axis; and the "image section freeze" function is assigned to this range. Provided the directional differences are within this range, the target position data remain the same.

Furthermore a second directional difference range is defined, which consists of all remaining directional differences that may be compensated by the compensation device; the "displacement of the image section" function is assigned to this range. Provided the directional differences are within this second range, the target directional data are changed according to an algorithm in which above all direction and distance of the momentary directional difference in relation to the first directional difference range are included. The greater the distance from the range limit, the higher the velocity of the target image shift. This preferably takes place according to an exponential correlation: with a directional difference, for example of 2, 3, 4 and/or 5 degrees relative to the target direction, the velocity of the target direction is set for example to 0, 1, 10 and/or 100 degrees per second. For a directional difference of for example 3 degrees right of the target image center, the horizontal component of the target direction data is then increased continuously by 1 degree per second.

The directional difference may be communicated with eight arrows optically illustrated around the viewfinder image, for example. These arrows can be modulated in their color, brightness and/or flash frequency, whereby through the type of display the correlation between the directional difference and the alignment difference ranges is made perceptible to the user. For example, provided the directional difference values are located within the central first directional difference range A, the arrows may shine steady green, their brightness reflecting the size and direction of the momentary directional difference. For a directional difference of zero, all arrows may shine equally brightly. For a directional difference for example of 1 degree to the right, the right arrow may shine more brightly and the other arrows shine correspondingly less brightly. If the directional difference approaches the range limit of 2 degrees, the corresponding arrow may be displayed yellow and, additionally, also flashing. If the directional difference exceeds the range limit, the corresponding arrow may be displayed in red.

In one embodiment, the user may intentionally produce an image freeze by holding the arrows in the green range through corresponding alignment of the binoculars. This is not overly difficult for the user since, in this example, the central directional difference range for the "image freeze" function with two degrees around the target position of the optical axis is selected here so that it is greater than the disturbance value amplitude caused by trembling and swaying of the user.

In another embodiment, the user can increase the central directional difference range 1 for image freeze by pressing a key for example from two to four degrees around the target position of the optical axis. As a result, even when standing on a swaying base such as on a boat, he may hold the arrows in the green or yellow range and therefore achieve a blur-free and fluctuation-free image section.

The user may also determine when the image section is to be shifted, in accord with one embodiment. To do this, in this variant embodiment, he aligns the image capture system (e.g., binoculars) for example to the right until the right arrow turns red, after which the image section begins to move to the right; the movement is faster the faster the binoculars are moved to the right. Since the velocity of the image section displacement for velocities greater than zero depends on the momentary amount of the directional difference, no optimum stabilization of the image section displacement movement is achieved; in the case of binoculars, however, this is also not of great importance. By corresponding alignment of the binoculars, as soon as the arrows are again steered into the green and/or yellow range, a direct and blur-free static image is obtained.

This variant of the invention can also naturally be used for a film camera recording on chemical film or for an amateur video camera.

In the case of binoculars or video cameras with angular acceleration sensors (and without gyroscopes) which cannot determine the absolute displacement velocity of the image section, and thus cannot recognize any static image section, the "even movement" function of the image section can be assigned to the first directional difference range and the "change of the momentary movement" function of the image section can be assigned to the second directional difference range. As a result, an image freeze can also be achieved and maintained by the user initially slowing down a momentary movement to a stop through corresponding alignment of the binoculars and then holding the directional difference within the first range.

To overcome the drawbacks of angular acceleration sensors, the unknown angular velocity may be synchronized to a known value whenever a motion analyzis of the projected image sequence detects a reliable velocity value (which is for example easiest for the velocity zero). Since this variant of the invention only takes the directional difference in relation to the target alignment of the optical axis into consideration, no absolutely stable or blur-free image section can be obtained with strong magnification and short focal distance. This instability however may be suppressed by taking into consideration the positional difference. The lacking stabilization of the horizon position on the other hand in the case of binoculars is only of minor importance.

The following U.S. Patents provide useful background for the teachings herein and are incorporated herein by reference: U.S. Pat. No. 5,282,044; U.S. Pat. No. 5,886,744; U.S. Pat. No. 6,445,411; U.S. Pat. No. 6,069,656.

Figure 2A:
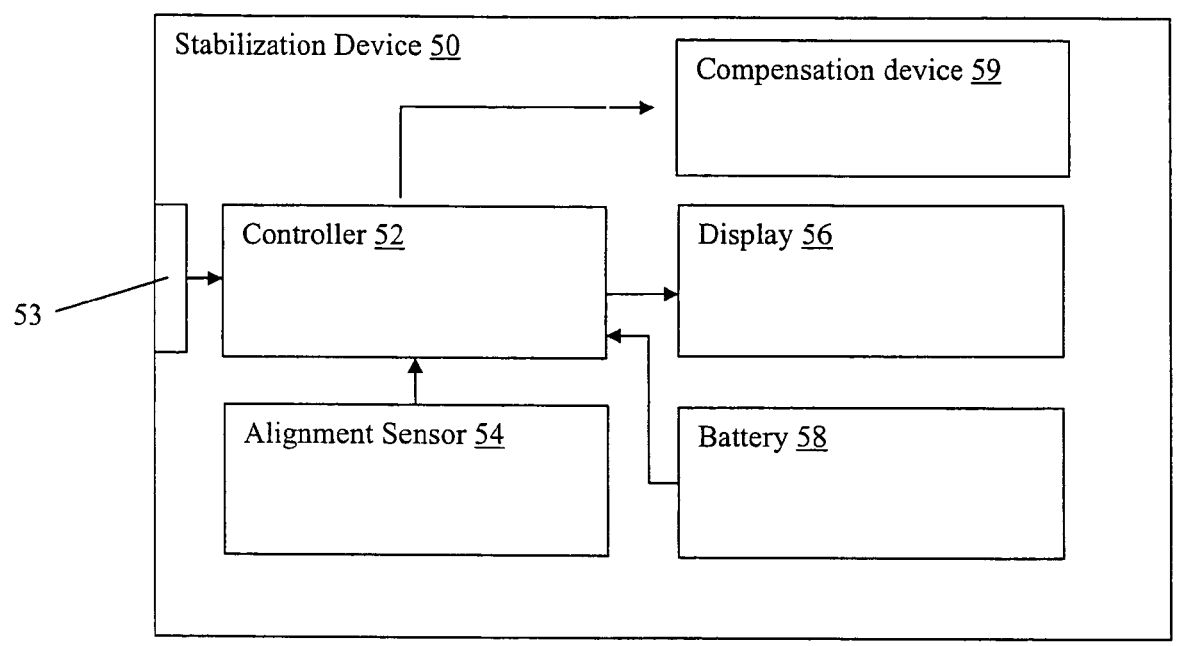
FIG. 2A shows one stabilization device according to one embodiment, which may be used to implement the methods according to the invention.

FIG. 2A shows basic elements of one stabilization device 50, with which the present invention, especially the methods according to the invention, can be put into practice. Device 50 comprises a controller 52, a user interface 53, an alignment sensor 54, a display 56, a battery 58 and a compensation device 59. An image capture system comprising device 50 is suitable to provide image stabilization or stabilized image section displacement according to the present invention. The compensation device 59 for example operates as image shift device 19, FIG. 2, and/or as compensation device 20, such that compensation can be achieved in focal plane array 22. Thus, compensation for directional alignment differences or horizon differences can be achieved. User interface 53 is for example a button or other user-controllable element (e.g., a knob) that facilitates user action and control of device 50.

The basic operation of device 50 will now be explained. Various modes of operation are described in more detail below with reference to FIG. 3-6, but references will illustratively be made, as an example, to the embodiment according to FIG. 3.

Figure 3:
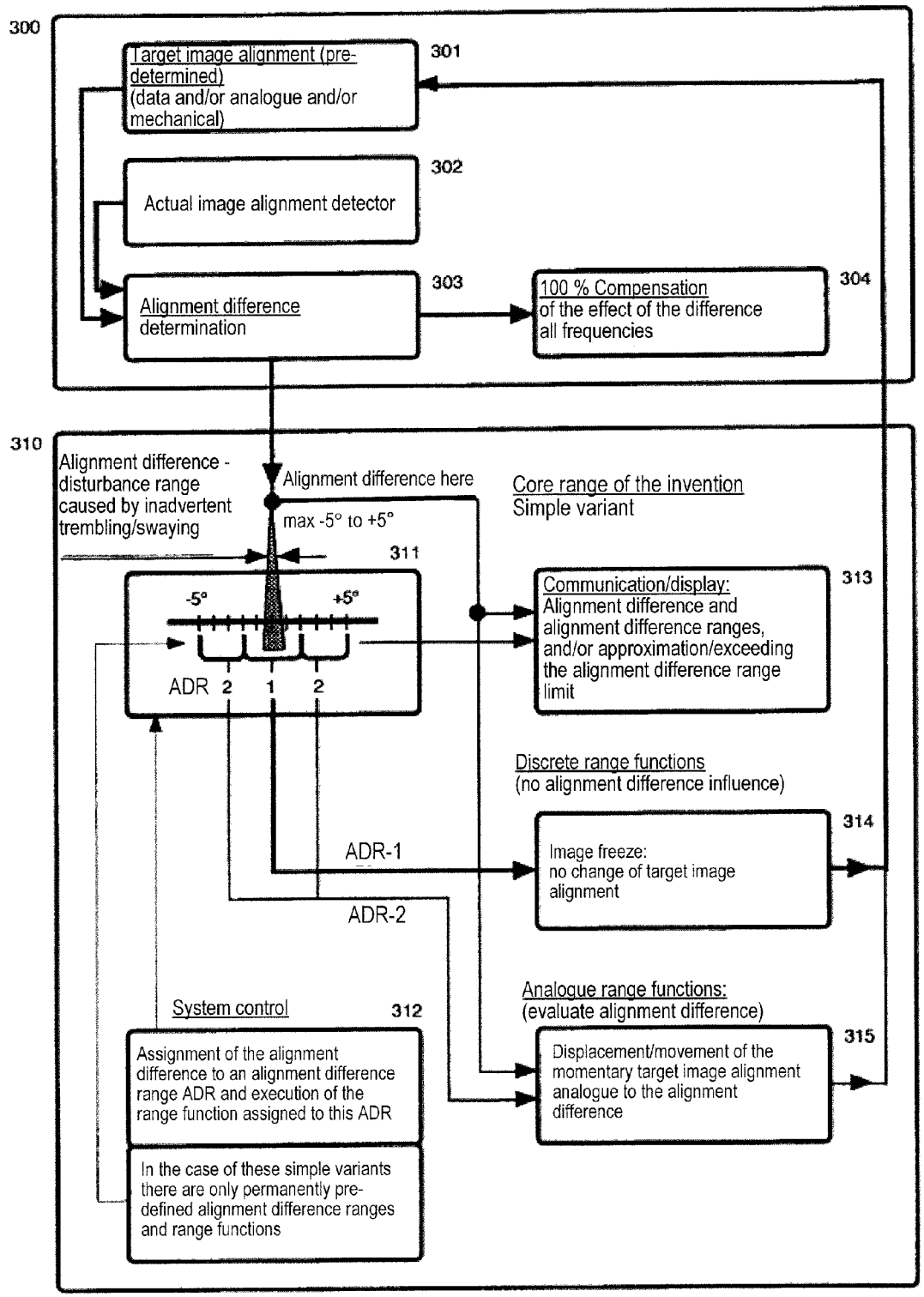
FIG. 3 shows a block functional diagram to illustrate an embodiment of a image stabilization device according to the invention.

In illustrative operation, therefore, device 50 compares target image alignment data (functional block 301, FIG. 3) with actual alignment image data (functional block 302, FIG. 3), and determines the alignment difference (functional block 303, FIG. 3). In one embodiment, functional blocks 301 and 303 are implemented by controller 52, and functional block 302 by means of alignment sensor 54, which, for example, can comprise a gyroscope or an accelerometer. Functional block 301 may be provided through data storage in internal memory of controller 52, for example, and functional block 303 may be provided by processing functions (e.g., software) of controller 52.

The alignment difference data as determined by controller 52 are provided to the compensation device 59 and the display 56. In FIG. 3, functional block 304 corresponds to compensation device 59, and functional block 313 to display 56. Accordingly, both the compensation device 59 and the display 56 are provided with these alignment difference data; this enables a user of the image capture system (e.g., system 10, FIG. 1) provided with the image stabilization according to the invention to effectively produce stabilized images, as will be explained in detail below. Especially, the alignment difference information provided to the user via the display 56 renders possible an efficient functioning of the compensation device 59, as the user can, then, keep the alignment difference within a desired or pre-determined range by orientating the image capture system in space. Stabilization information may for example be displayed to the user on display 56 in a manner like the viewfinder image of FIG. 1.

Further, to provide these alignment difference data to compensation device 59 and display 56, these data are processed/analyzed with respect to alignment difference ranges and/or functions associated with these ranges. These ranges and functions are stored in controller 52. Thus, in FIG. 3, functional blocks 311 (comparing alignment difference data with specific alignment difference ranges) as well as functional blocks 314 to 315 (specifying and implementing specific range functions) are implemented/operated by the processing and storage memory of controller 52. Further, the system control (as specified in functional block 312 in FIG. 3) is implemented by controller 52.

User interface 53 is for example useful to program user-selectable features of the invention. For example, in one embodiment, a user may specify, through a button of user interface 53, a target alignment Z at the start of image capture for image capture system 10; alternatively the start of filming may automatically determine target alignment Z at the start of image capture. In another example, the user may specify, through interface 53, a directional difference range (e.g., 3 degrees of permissible motion about point Z) for which device 50 should maintain stability; the permissible motion is for example represented by circle R1 in FIG. 1. This pre-set difference range R1 may therefore be set so that it is greater than the user's typical trembling and swaying motion. In another example of operation, the user may specify a velocity V (FIG. 1) through user interface 53; alternatively V may be determined automatically by controller 52 during use of image capture system 10, for example when image capture system 10 is panned outside of circle R1 for a predetermined amount of time (this time, too, may be specified through user interface 53, for example).

User interface 53, display 56 and battery 58 are shown illustratively. It should be clear that these items may be separate from device 50 to provide like function. For example, user interface 53 may comprise buttons on the image capture system, display 56 may be the display integrated with the image capture system, and battery 58 may be the main power pack of a hand-held image capture system, providing power to both display 56 and controller 52, as shown.

It should be noted that user movement of the image capture system can embody user interface 53. That is, by steering the image capture system, automatic functions of the image capture system may occur. For example, simply through steering of the image capture system, target alignment Z can be just be determined automatically by the image capture system.

As mentioned, controller 52 includes software and/or firmware that may be implemented (e.g., programmed) in accordance with the embodiments of FIG. 3-FIG. 6, described below.

Preferred embodiments of the invention will now be described with reference to FIG. 3 to FIG. 6. In these figures, two main blocks are shown: 300 and 310, 400 and 410, 500 and 510, 600 and 610, respectively. Functional blocks within 300, 400, 500 and 600 (optionally with further components) for example constitute basic stabilization device functionality, while functional blocks within 310, 410, 510 and 610 provide for alignment ranges, range functions, display and system control.

Accordingly, FIG. 3 illustrates a functional diagram of one embodiment of an image stabilization device according to the invention. In the diagram, alignment of the optical axis is taken into consideration, which for amateur binoculars or amateur video cameras can be sufficient since undesired movements of the optical axis have by far the greatest effect on image stability. The position of the image capture system and the horizon position may also be taken into consideration in connection with the diagram.

Functional block 301 pre-determines the target alignment of the optical axis, by for example storing corresponding direction data in memory (e.g., within controller 52, FIG. 2A). An initial value can for example be an arbitrary 30 degrees east and 10 degrees under the horizon.

An actual positional detector 302 determines the real direction of the structural optical axis. For this purpose a gyroscope can be used as the detector (e.g., alignment sensor 54, FIG. 2A). If the horizon position and the alignment to the zenith are not determined, fictitious initial values for the alignment of the optical axis can be assumed, for example 0 degrees under the horizon, whereby a rotation around the vertical axis of the image capture system then changes the value of the alignment concerning the direction of the sky, and a rotation around the transverse axis of the image capture system changes the value for the inclination to the horizon.

Functional block 303 determines the directional difference between actual direction and target direction and converts this into the two components, which can be compensated by the compensation device 304 (e.g., device 59, FIG. 2A), for example the two angles to be compensated around the vertical axis and the transverse axis of the image capture system. The compensation device 304 then fully compensates the alignment difference, as previously mentioned.

Core functionality of the image stabilization device according to the invention is now discussed in connection with functional blocks 311 to 315. Here two directional difference ranges 311 are pre-determined by a system control 312: a central range ADR-1 of 2 degrees around the target direction of the image section center and a remaining range ADR-2 between 2 degrees and 5 degrees around the target direction of the image section center. System control 312 now constantly monitors into which range the momentary alignment difference of the structural optical axis falls. At the same time, the directional difference concerning the range limits is communicated to the user via the communication device 313 (e.g., display 56, FIG. 2A), so that the user can intentionally steer the directional difference into one of the ranges and hold it there by corresponding alignment of the image capture system. ADR is used as Abbreviation for "Alignment Difference Range".

If the directional difference is held for a minimum time within the range ADR-1, the discrete range function 314 "image freeze" is called up and executed by system control 312, which leaves the momentary target coordinates of the target alignment of the optical axis unchanged as long as this range function is active. Even if the directional difference value due to trembling and swaying of the image capture apparatus moves irregularly within +/−2 degrees around the target alignment, a still standing image sequence is captured, since the target alignment remains unchanged and the compensation device 304 fully compensates the directional differences. Since the user can hold the directional difference with the help of communication device 313 within ADR-1 for an arbitrary period, he can obtain a stable, still standing blur-free image sequence in this way for an arbitrary duration, which is not feasible for conventional image capture systems.

If the directional difference is now steered by the user into the range ADR-2, the analogue range function 315 "displacement/movement" of the target alignment of the optical axis is called up and executed by system control 312, which changes the momentary target alignment of the optical axis all the faster the further the directional difference is distant from the limit of the range ADR-1, the direction of the change being derived from the direction of the directional difference to the centre of ADR-1. The target direction hereupon follows analogously to the alignment of the image capture system. Inadvertent fluctuations of the directional difference are included in the displacement velocity. In addition, arbitrary directional initial values are synchronized by this range function, when the image capture system is switched on, with directional difference values that cannot be compensated since any large directional difference tracks the target position with high velocity, so that the directional difference is automatically reduced in the briefest time to values which can be compensated.

Figure 4:
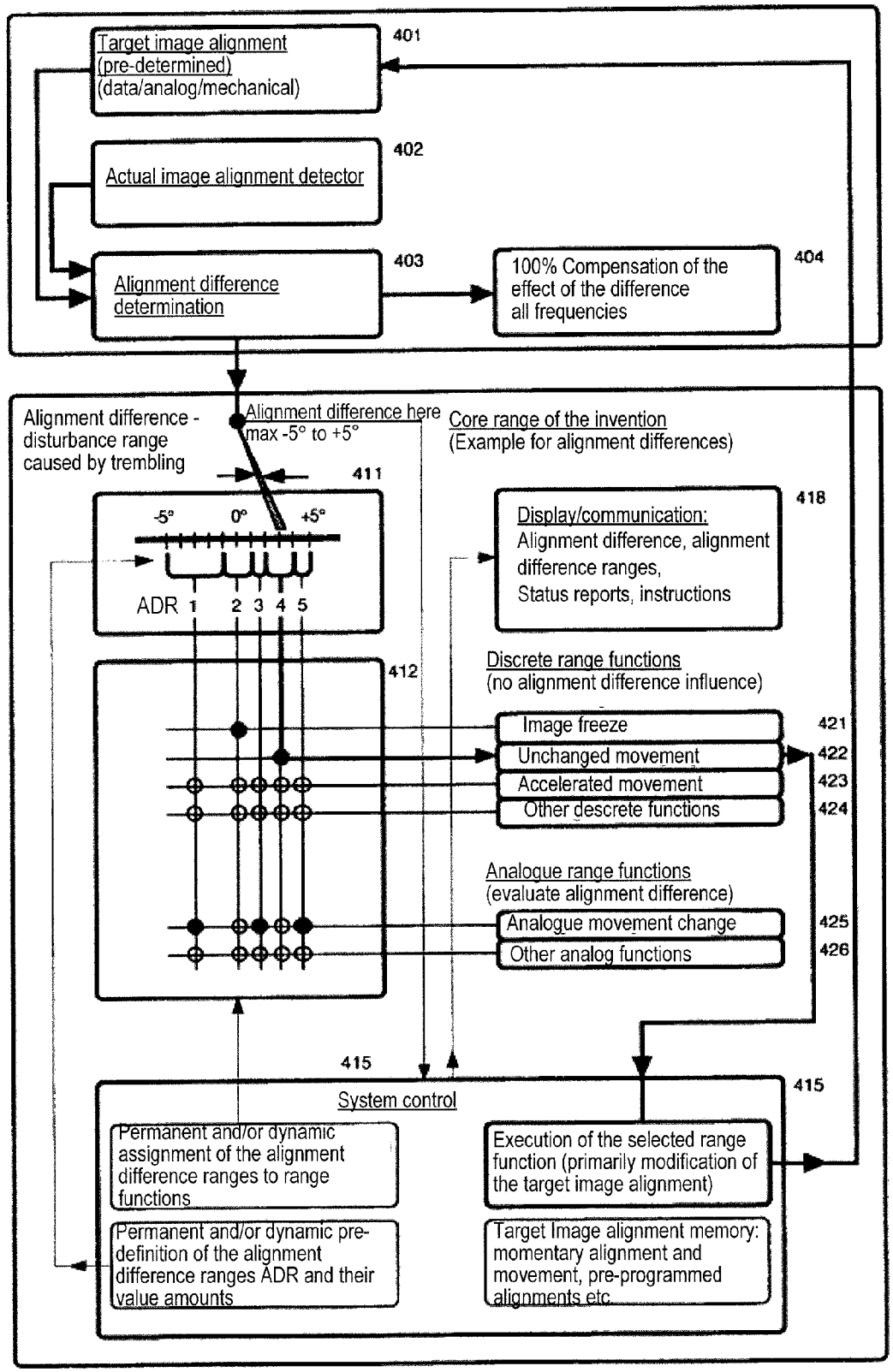
FIG. 4 shows another embodiment of an image stabilization device according to the invention.

FIG. 4 illustrates a functional diagram of a more complex embodiment of an image stabilization device according to the invention, such as for a professional film camera for example. In the further description only the differences to the embodiment according to FIG. 3 are considered.

The main differences consists in the fact that there are more than two directional difference ranges whereby some can be variable in their position and size, such as for example the directional difference range ADR-4 for the range function "constant movement" of the target image direction. This range is only activated by system control 415 if the directional difference has left the central range ADR-2 for "image freeze". Its position and therefore its range of values are preferably a function of the velocity and direction of the momentary displacement velocity of the target image direction, as already described above. Provided the directional difference is held by the user within this range ADR-4, the range function 422 is executed by the system control 415, which changes the target direction coordinates of the target image, corresponding to the target displacement velocity existing before call up of 422, evenly and constantly. This even movement of the target image section is then free from undesired directional difference fluctuations. This naturally also applies due to the always present full compensation of directional differences for the captured image section.

For intentional control of the directional difference by the user, a graphic display 418 (e.g., display 56, FIG. 2A) with graphic indication of the directional difference ranges ADR 1, 2, 3, 4 . . . is provided here in the form of graphic symbols and graphic display of the directional difference in the form of cursors (see also description of FIG. 1 and FIG. 2).

Figure 5:
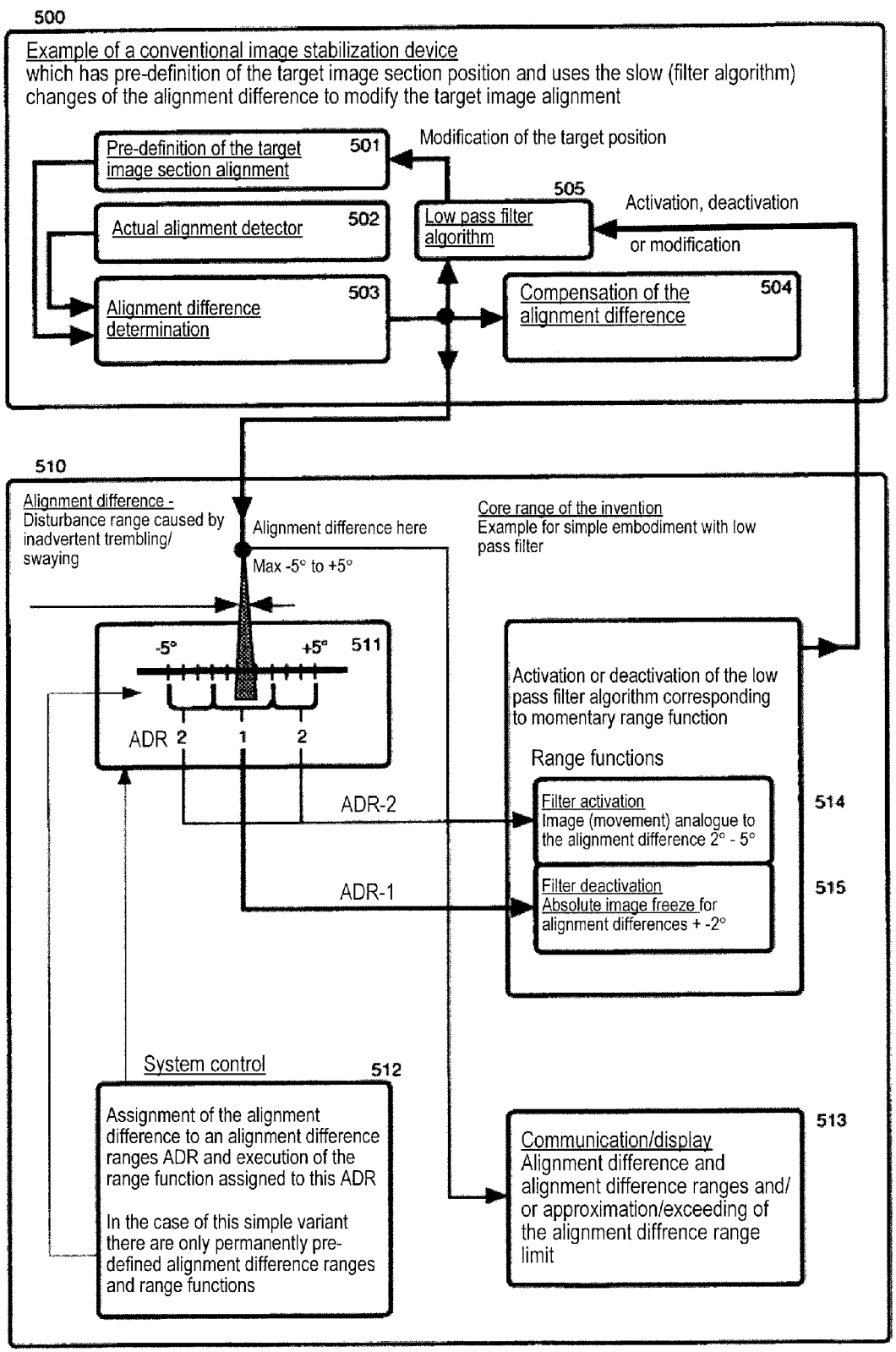
FIG. 5 shows another embodiment of an image stabilization device according to the invention, illustrating how conventional stabilization devices can be modified without reconstruction in order to exploit certain advantages of the invention.

FIG. 5 illustrates a functional diagram of an image stabilization device according to the invention, which indicates how conventional stabilization devices can be modified without reconstruction, in order to use certain advantages of the invention. In the further description only the differences to the embodiment according to FIG. 3 are considered.

A conventional stabilization device is thus illustrated with 501 to 505 of the group 500. One difference to FIG. 3 consists in the fact that the core range 510 of the invention intervenes in the existing low-pass filter logarithm 505 of the conventional stabilization device. In the simplest case, this is deactivated by the range function 514 for "image freeze", assigned to the directional difference range ADR-1, during execution of this function, so that it then no longer changes the target image direction. The image section is then frozen, unaffected by directional alignment fluctuations.

If the directional difference is steered into the range ADR-2 by the user and if the corresponding range function 515 is executed, this restarts the filter algorithm and the image capture system regarding the function of the image section displacement/movement behaves like a conventional stabilization device.

Figure 6:
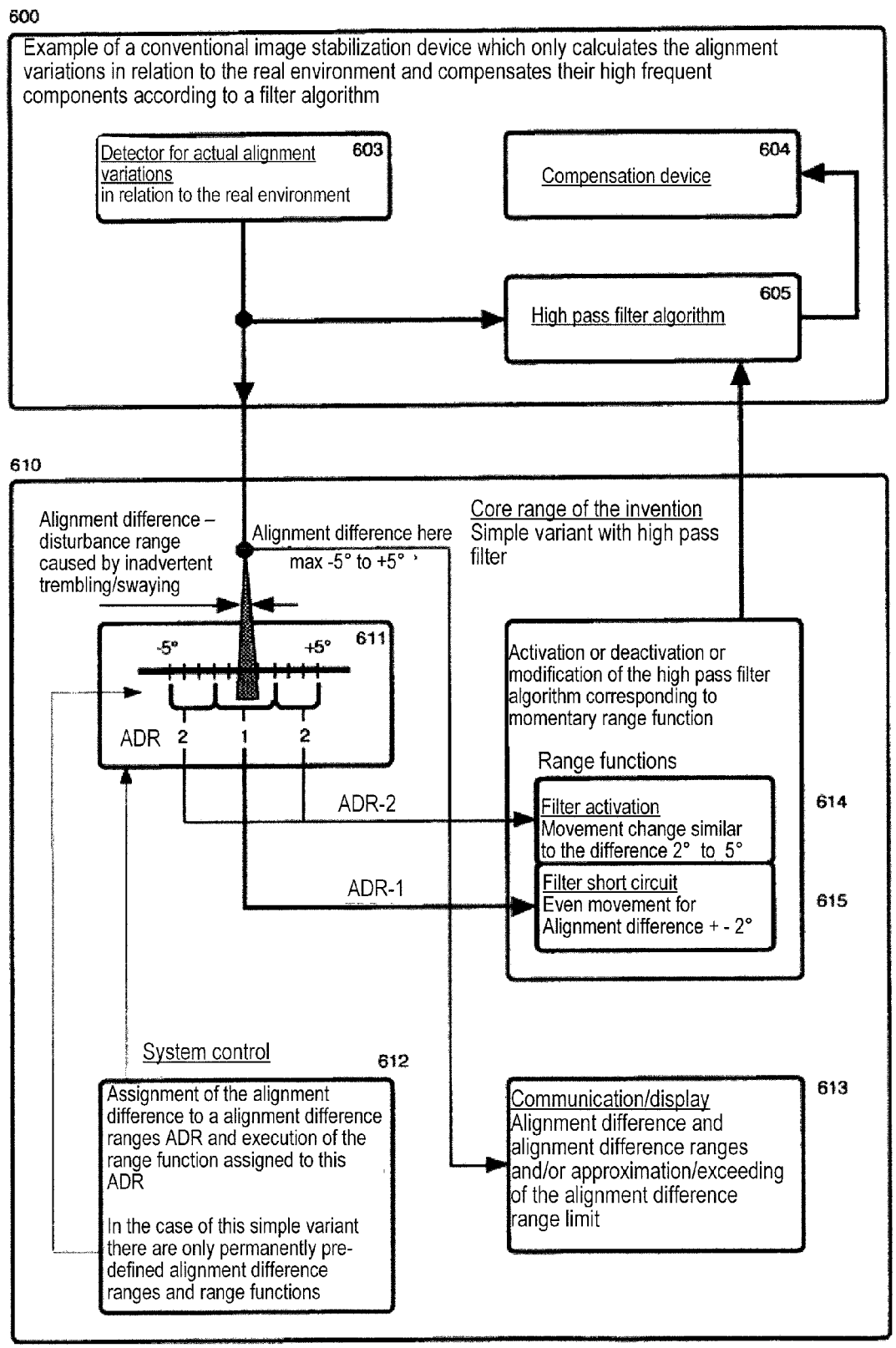
FIG. 6 shows another embodiment of an image stabilization device according to the invention, illustrating how conventional stabilization devices can be modified without reconstruction in order to exploit certain advantages of the invention.

FIG. 6 illustrates a functional diagram of an image stabilization device according to the invention, which indicates how a further variant of a conventional stabilization device can also be modified without reconstruction, in order to use certain advantages of the invention. In the further description only the differences to the embodiment according to FIG. 3 are considered.

A conventional stabilization device is illustrated with 603 to 605 of the group 600. One difference to FIG. 3 consists in the fact that the core range 610 of the invention intervenes in the existing high-pass filter algorithm 605 of the conventional stabilization device. In the simplest case, this range function 615 for "even movement", assigned to the directional difference range ADR-1, is "short-circuiting" the high-pass filter during execution of this function, so that detected actual alignment fluctuations of frequency are compensated by the compensation device 604. The image section then maintains its movement unaffected by alignment fluctuations.

If the directional difference is steered into the range ADR-2 by the user, and if the corresponding range function 614 is executed, this restarts the filter algorithm and the image capture system regarding the function of changing the image section movement behaves like a conventional stabilization device.

Figure 7:
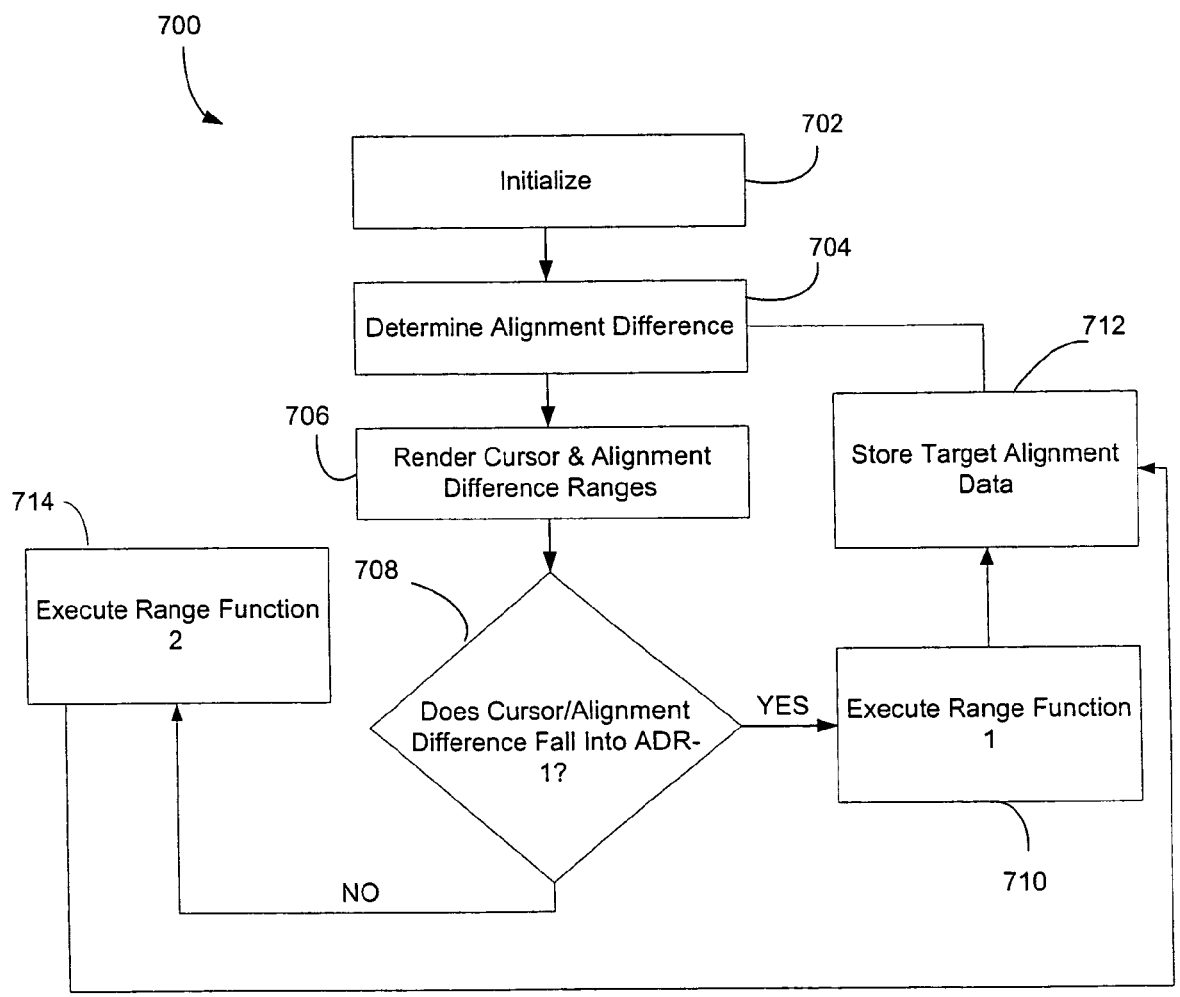
FIG. 7 shows a process for stabilizing an image in accord with one embodiment.

FIG. 7 shows one process 700 for stabilizing an image in accord with one embodiment. Process 700 is for example implemented by controller 52, FIG. 2A. In step 702, process 700 is initialized. In one example of step 702, the image capture system automatically initializes to function as described herein. But step 702 may include user intervention and control of the image capture system. Accordingly, in one example of step 702, a user presses a button on user interface 53, FIG. 2A, to set position Z, wherein, optionally, controller 52 then renders Z on display 56. In another example of step 702, position Z is automatically determined at the start of image capture (e.g., by pressing "start" on user interface 53). In still another example of step 702, a user specifies information such as intended pan motions or variables specifying acceptable ranges or values of motion, such as a number of degrees (difference range) for circle R1, FIG. 1, or a range of values specifying R2, FIG. 1.

In step 704, an alignment difference is determined. In an example of step 704, the alignment sensor 54, FIG. 2A, provides alignment information to controller 52, which in turn determines the alignment difference and communicates the alignment difference to compensation device 59.

In step 706, the cursor and alignment difference ranges are rendered. In an example of step 706, controller 52 displays cursor C1 and R1 on display 56.

Step 708 is a decision to determine whether the cursor/alignment difference fall within a difference range, for example ADR-1. If for example cursor C1 is inside the difference range of R1, then range function 1 may be executed as in step 710, as shown. In range function 1, for example, controller 52 operates to keep target alignment and data constant to "freeze" the image. Continuing, target alignment data is stored, for example within memory of controller 52, in step 712.

If however C1 is outside the difference range R1, for example, then range function 2 may be executed as in step 714. In range function 2, for example, controller 52 operates to constantly modify target alignment data according to distance and direction of the alignment difference to ADR-1. Continuing, target alignment data is stored, for example within memory of controller 52, in step 712.

Process 700 repeats as desired to continuously update, for example, display 56.

It should be apparent that process 700 may include a variety of like functions. For example, in step 702, a user may specify, through interface 53, a target horizon. Controller 52 may then determine and similarly render both real and target horizons, as well as alignment cursor C3, as in FIG. 1.

It should be apparent that process 700 may be modified to similarly illustrate operations of the methods shown in FIG. 4-FIG. 6, for example to accommodate display of cursor C1 and circle R2 in the presence of velocity caused for example by panning of the image capture system.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A stabilization device for hand-held image capture system, comprising:

a controller for determining an alignment difference between an actual alignment of the image capture system and a target alignment of the image capture system; and a compensation device for compensating for the determined alignment difference on a projected image section, the controller communicating the alignment difference, with respect to one or more alignment values or ranges of values stored by the controller, to a display, such that a user is able, by adjusting an orientation of the image capture system, to steer the alignment difference to the one or more alignment values or ranges of values or within the one or more alignment values or ranges of values, wherein at least one pre-definable alignment difference value or at least two pre-definable ranges of alignment difference values are provided, and wherein at least one function is assigned to the at least one pre-definable alignment difference value or each of the at least two pre-definable ranges of alignment difference values, the at least one function being selectable by steering the alignment difference with respect to the at least one pre-definable alignment difference value or the at least two pre-definable ranges of alignment difference values, and wherein the at least one function comprises a stabilization function that is assigned to the at least one pre-definable alignment difference value or to one of the at least two pre-definable ranges of alignment difference values, such that the stabilization function is automatically selected when the alignment difference is steered with respect to the at least one pre-definable alignment difference value or to one of the at least two pre-definable ranges of alignment difference values, the stabilization function comprising an automatic compensation by the compensation device.

2. The stabilization device according to claim 1, further comprising the display being integrated with the image capture system.

3. The stabilization device according to claim 1, wherein the controller stores parameters defining a target image section according to an algorithm, such that "freeze" or "even movement of the image section" functions of the image capture system are substantially unaffected by an actual value of the alignment difference so long as the actual value, controlled by the user, lies within a fixed alignment difference range or variably pre-definable alignment difference range.

4. The stabilization device according to claim 3, wherein effects of alignment differences on the projected image section are automatically compensated by the compensation device.

5. The stabilization device according to claim 3, wherein an alignment difference range assigned to a particular function is pre-determined to be greater than an extent of a disturbance value range caused by user motion.

6. The stabilization device of claim 3, the parameters comprising one or more of position, alignment and movement.

7. The stabilization device according to claim 1, the controller implementing tasks for each of a plurality of difference ranges throughout a total range of the compensation device.

8. The stabilization device according to claim 1, wherein the stabilization automatically removes or reduces effects caused by disturbance of the image capture device within the at least one pre-definable alignment difference value or the at least two pre-definable ranges of alignment difference values.

9. A method for stabilizing an image generated from a hand-held image capture system, comprising:
    determining an alignment difference between an actual alignment of the image capture system and a target alignment of the image capture system;
    displaying the alignment difference relative to one or more alignment values or ranges of alignment values; and
    compensating an actual alignment difference of the image capture system, in response to user orientation of the image capture system, to steer the alignment difference to the one or more alignment values or within the ranges of alignment values,
    wherein at least one pre-definable alignment difference value or at least two pre-definable ranges of alignment difference values are provided, and wherein at least one function is assigned to the at least one pre-definable alignment difference value or each of the at least two pre-definable ranges of alignment difference values, the at least one function being selectable by steering the alignment difference with respect to the at least one pre-definable alignment difference value or the at least two pre-definable ranges of alignment difference values, and wherein the at least one function comprises a stabilization function that is assigned to the at least one pre-definable alignment difference value or to one of the at least two pre-definable ranges of alignment difference values, such that the stabilization function is automatically selected when the alignment difference is steered with respect to the at least one pre-definable alignment difference value or to one of the at least two pre-definable ranges of alignment difference values, the stabilization function comprising an automatic compensation.

10. A stabilization device for image stabilization and/or stabilized image section displacement, for hand-held image capture apparatus having a device for determining an alignment difference between an actual alignment of the image capture apparatus and a target alignment of the image capture apparatus, and having a compensation device for compensating the effect of a determined alignment difference on a projected image section, characterized by a communication device for communicating the alignment difference with respect to pre-definable alignment difference values or ranges of alignment difference values, the information from the communication device being communicated such that a user is able, by adjusting an orientation of the image capture apparatus, to steer the alignment difference to a pre-determined value or into a pre-determined range of values,
    wherein at least one pre-definable alignment difference value or at least two pre-definable ranges of alignment difference values are provided, and wherein at least one function is assigned to the at least one pre-definable alignment difference value or each of the at least two pre-definable ranges of alignment difference values, the at least one function being selectable by steering the alignment difference with respect to the at least one pre-definable alignment difference value or the at least two pre-definable ranges of alignment difference values, and
    wherein the at least one function comprises a stabilization function that is assigned to the at least one pre-definable alignment difference value or to one of the at least two pre-definable ranges of alignment difference values, such that the stabilization function is automatically selected when the alignment difference is steered with respect to the at least one pre-definable alignment difference value or to one of the at least two pre-definable ranges of alignment difference values, the stabilization function comprising an automatic compensation by the compensation device.

11. The stabilization device according to claim 10, characterized in that parameters defining a target image section can be pre-determined according to an algorithm, which for "freeze" or "even movement of the image section" functions are not affected by an the actual value of the alignment difference, as long the actual alignment difference value, as intentionally controlled by the user, lies within a fixed or variably pre-definable alignment difference range assigned to a particular function and whereby an effect of alignment differences on the projected image section can be fully compensated, independent of frequency, by the compensation device.

12. The stabilization device according to claim 10, characterized in that a value range of an alignment difference range assigned to a particular function can be pre-determined to be greater than an extent of a disturbance value range caused by user trembling and/or swaying.

13. The stabilization device according to claim 10, characterized in that for the purpose of communicating and evaluating an alignment difference in regard to alignment difference ranges, a variable offset value can be added to physical alignment differences and calculated so that an average physical alignment difference falls back to zero or close to zero in a predetermined time, and/or wherein high frequency fluctuations of the physical alignment difference values are suppressed.

14. The stabilization device according to claim 10, characterized in that an alignment difference range with a range function sets a momentary displacement movement of a target image section to zero or keeps to a constant value, and is overlaid by one or several further alignment difference ranges, the range function of which is additionally executed, if the alignment difference falls into the alignment difference range or if the alignment difference falls into the alignment difference range and a further condition is fulfilled.

15. A method for the execution of image stabilization and/or stabilized image section displacement in the case of a hand-held image capture apparatus,
wherein an alignment difference between an actual alignment of the image capture apparatus and a target alignment of the image capture apparatus is determined, and an effect of a determined alignment difference on a projected image section is compensated, characterized in that an alignment difference concerning pre-definable alignment differences or ranges of alignment difference values is communicated to a user of the image capture apparatus, the information from the image capture device being communicated such that the user is able, by adjusting an orientation of the image capture apparatus, to steer the alignment difference to a pre-determined or arbitrary value or into a pre-determined range of values,
wherein at least one pre-definable alignment difference value or at least two pre-definable ranges of alignment difference values are provided, and wherein at least one function is assigned to the at least one pre-definable alignment difference value or to each of the at least two pre-definable ranges of alignment difference values, the at least one function being selectable by steering the alignment difference with respect to the at least one pre-definable alignment difference value or the at least two pre-definable ranges of alignment difference values, and
wherein the at least one function comprises a stabilization function that is assigned to the at least one pre-definable alignment difference value or to one of the at least two pre-definable ranges of alignment difference values, such that the stabilization function is automatically selected when the alignment difference is steered with respect to the at least one pre-definable alignment difference value or to one of the at least two pre-definable ranges of alignment difference values, the stabilization function comprising an automatic compensation.

* * * * *